United States Patent [19]

Tucker

[11] Patent Number: 5,152,574
[45] Date of Patent: Oct. 6, 1992

[54] APPARATUS FOR ATTACHING A COVER FOR AN OPEN-TOPPED VEHICLE ENCLOSURE

[75] Inventor: David Tucker, Long Grove, Ill.

[73] Assignee: Design Automotive Trim and Accessories, Inc., Addison, Ill.

[21] Appl. No.: 657,519

[22] Filed: Feb. 19, 1991

[51] Int. Cl.⁵ .............................. B60J 7/10
[52] U.S. Cl. ................................ 296/100
[58] Field of Search ..................... 296/100, 98

[56] References Cited

U.S. PATENT DOCUMENTS

| | | | |
|---|---|---|---|
| 2,357,056 | 8/1944 | Nelson | 135/7.1 |
| 2,639,751 | 5/1953 | Flaherty | 150/52 |
| 2,937,652 | 5/1960 | Zimmer, Jr. et al. | 135/6 |
| 2,961,725 | 11/1960 | McGee | 24/73 |
| 3,172,419 | 3/1965 | Lewis | 135/6 |
| 3,649,072 | 3/1972 | Cross | 296/137 B |
| 3,727,927 | 4/1973 | Belk | 296/137 R |
| 3,762,763 | 10/1973 | Deshores | 296/137 B |
| 3,773,380 | 11/1973 | Stockdill | 296/137 B |
| 3,936,077 | 2/1976 | Bliek | 280/423 R |
| 4,273,377 | 6/1981 | Alexander | 296/100 |
| 4,285,539 | 8/1981 | Cole | 296/105 |
| 4,479,677 | 10/1984 | Gulette et al. | 296/98 |
| 4,496,184 | 1/1985 | Byrd et al. | 296/100 |
| 4,547,014 | 10/1985 | Wicker | 296/100 |
| 4,607,876 | 8/1986 | Reed | 296/100 |
| 4,639,033 | 1/1987 | Wheatley et al. | 296/100 |
| 4,647,103 | 3/1987 | Walblay | 296/100 |
| 4,730,866 | 3/1988 | Nett | 296/100 |
| 4,807,921 | 2/1989 | Champie, III et al. | 296/98 |
| 4,838,602 | 6/1989 | Nett | 296/100 |
| 4,923,240 | 5/1990 | Swanson | 296/100 |

FOREIGN PATENT DOCUMENTS 213990 3/1957 Australia.

OTHER PUBLICATIONS

Innovative Accessories Inc. Brochure.
Sport Masters Brochure.
Extang Corp. advertisement, Sport Truck Magazine, Feb. 1990, p. 25.

Primary Examiner—Robert R. Song
Assistant Examiner—Joseph D. Pape
Attorney, Agent, or Firm—Dick and Harris

[57] ABSTRACT

An apparatus for attaching a cover for an open-topped vehicle enclosure including at least one rail member resting on a top wall of the side wall of the enclosure. Mounted on the rail member is a cover attachment member engageable with a peripheral portion of a cover. The rail member is held in place on the side wall of the enclosure by cooperating upper and lower clamp members.

16 Claims, 4 Drawing Sheets

APPARATUS FOR ATTACHING A COVER FOR AN OPEN-TOPPED VEHICLE ENCLOSURE

BACKGROUND OF THE INVENTION

The present invention is directed to covers for the beds of pickup type trucks and the like, and in particular, to systems for attaching such covers to the beds of pickup type trucks and similar stowage spaces. Such covers are also employed for use on open bed trailers, and on recreational vehicles, such as small boats.

In vehicles, such as pickup trucks or small open boats, or in open bed trailers, for example, where there are areas which are generally exposed to the elements, it is often desirable to provide a cover, which will protect such areas when not in use, or when in use in inclement weather, or when visual inspection of such open areas is not desired. In order to permit maximized use of such open areas, it is also desirable to provide such a cover which is relatively quickly and substantially completely removable when so desired.

Such covers typically comprise an expanse of flexible covering material which has been treated, or is inherently resistant to the effects of the elements.

Attachment of such covering material has been accomplished, in the prior art, in a variety of ways. One such method may employ the permanent affixation of attachment members to the vehicle, for example, the bed of a pickup truck. Such a method is shown in U.S. Pat. No. 3,727,972 to Belk. In Belk, buttons are attached directly to the top edges of the truck bed side walls, by screws. The cover has eyelets formed along its periphery, to slip around and engage the eyelets. Rods are sewn into the periphery of the cover, to the outside of the eyelets, to take the load created by the tension of the cover off of the outer portions of the eyelets. Handles attached to the rods permit the user to pull the cover over the eyelets and into place.

The drilling of permanent holes is necessary to the use of such a cover, which may not be desired, and should changes in the spacing of the eyelets due to shrinkage or other reasons occur, alignment of the buttons with the eyelets may be difficult or impossible. A similar cover is shown in U.S. Pat. No. 4,479,677 to Gulette et al. In Gulette et al., the cover is rolled onto a reel, which is housed in a box at one end of the truck bed. Rails are permanently attached to the side walls of the truck bed. The rails carry snap members which correspond to snap members affixed to the cover. Such a cover, by its nature, involves drilling into the body of the truck, which damage may not be desired. Further, the snap elements are rigidly fixed within the rails, and so cannot accommodate variations in the cover which may be induced by temperature and moisture, or aging of the cover.

Another type of cover is shown in U.S. Pat. No. 4,639,033 to Wheatley et al. In Wheatley et al., a number of flat flanges are clamped onto the tops of the side walls of a truck bed. The flanges extend along the length of the side walls and include outwardly projecting edges. A cover has J-shaped fasteners attached to its edges. Each fastener includes a lip which is configured to engage the outwardly projecting edge of the flange.

The apparatus of Wheatley et al. has several drawbacks, however. Significant variation in the dimensions of the cover can make alignment and engagement of the fasteners upon the edges of the flanges difficult. Further, the clamps used to attach the flanges grip the inner, downward-extending portions of the side walls with a horizontal gripping action, which requires that a bolt directly contact the side wall, which can lead to scratching, denting or other damage to the side wall. In addition, the position of the bolt is to the inside and underneath of the top edge of the side wall, which tends to make installation and removal of the clamps awkward and cumbersome. In addition, since the clamping action takes place in the horizontal plane, the clamping elements may be subject to the horizontal stresses produced by the cover itself and may work loose over time.

Still another cover apparatus is found in U.S Pat. No. 4,730,866 to Nett. In Nett, a plurality of rails are placed atop the side walls of a truck bed, and held in place by horizontally-acting fulcrum clamps. A number of snap fastener elements are slidably received by slots extending the length of the rails. A significant drawback of the Nett apparatus is that the clamps extend for a considerable distance below the top edges of the side walls, and must be considerably taller than the inner lip of the side wall. The clamps must contact the inner lip of the side wall, the top surface, and the outer wall of the side wall, in order to function. Further, the clamps are bolted to the rail members and place the rail members under twisting stresses which can lead to the ultimate deformation of the rails, and slippage of the clamps. The clamps also subject the inner rim, top edges and outer walls to considerable localized twisting stresses which can lead to deformation of the those portions of the truck bed side walls. Still another drawback of this apparatus is that should it be desired to remove the snaps from the rails, as the snaps must be slidingly removed, at least one corner piece must be removed to permit removal of the snaps. Also, as with Wheatley et al., since the clamping action takes place in the same direction as the tension of the cover, the clamps may tend to work loose.

An additional feature which is not provided for in the prior art, is the accommodation of side walls of the truck beds, or other enclosure, which are of varying widths.

Accordingly, it is an object of the invention to provide an apparatus for attaching removable cover for pickup truck beds, open boats, open bed trailers, and the like, which employs means for mounting the cover which do not require the permanent change or modification of the body of the object to be covered.

Another object of the invention is to provide an apparatus for attaching a removable cover which is capable of accommodating changes in the dimensions of the cover and still function satisfactorily.

Yet another object of the invention is to provide an apparatus for attaching a removable cover which utilizes rails which can be removably clamped onto the side walls of a truck bed, without marring the material of the side walls.

A further object of the invention is to provide such an apparatus for attaching a removable cover employing removable rails which may be readily and positively secured, and in which the clamping action takes place along a plane perpendicular to the plane of the cover.

Still another object of the present invention is to provide an apparatus for attaching a removable cover, which is configured to be mounted upon truck beds or similar enclosures, which have side walls of varying width.

These and other objects of the invention will become apparent in light of the present Specification, Claims and Drawings.

SUMMARY OF THE INVENTION

The present invention comprises an apparatus for attaching a cover for an open-topped vehicle enclosure, such as a pickup truck bed, the enclosure having a plurality of side walls, with each side wall including an outer wall, a top wall which extends substantially horizontally inward from the outer wall, and an inner wall projecting downward from said top wall.

At least one rail member is provided which has a bottom surface configured to rest on an upper surface of said top wall. At least one cover attachment member is removably affixable to said at least one rail member, for engaging a peripheral portion of the cover member.

To attach the rail member to the top wall of said side wall, at least one upper clamp member is rigidly engageable with the rail member. A lower clamp member is configured to grippingly receive a lip of the inner wall of the side wall.

The upper clamp member and the lower clamp member are operably engageable, and vertically adjustable relative to each other, to grasp or release the lip and inner wall, and the top wall of the side wall. Means are provided for adjusting the upper clamp member vertically relative to the lower clamp member.

In an alternative preferred embodiment of the invention, means are provided for enabling the apparatus for attaching a cover for an open-topped vehicle enclosure to be attached to enclosures having side walls with varying widths.

In another alternative preferred embodiment of the invention, means are provided for accommodating cross bar members which may extend from one side of the truck bed to the other side, either above or below the installed cover.

BRIEF DESCRIPTION OF THE DRAWINGS

FIG. 8 is a side elevation, in section, showing an alternative preferred embodiment of the invention, including an above-cover cross bar;

FIG. 8a is a top plan view of a closure member, according to the embodiment of FIG. 8;

FIG. 8b is a side elevation of the closure member of FIG. 8a; and

DETAILED DESCRIPTION OF THE DRAWINGS

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

Figures 1, 2, 3, 4, 5:
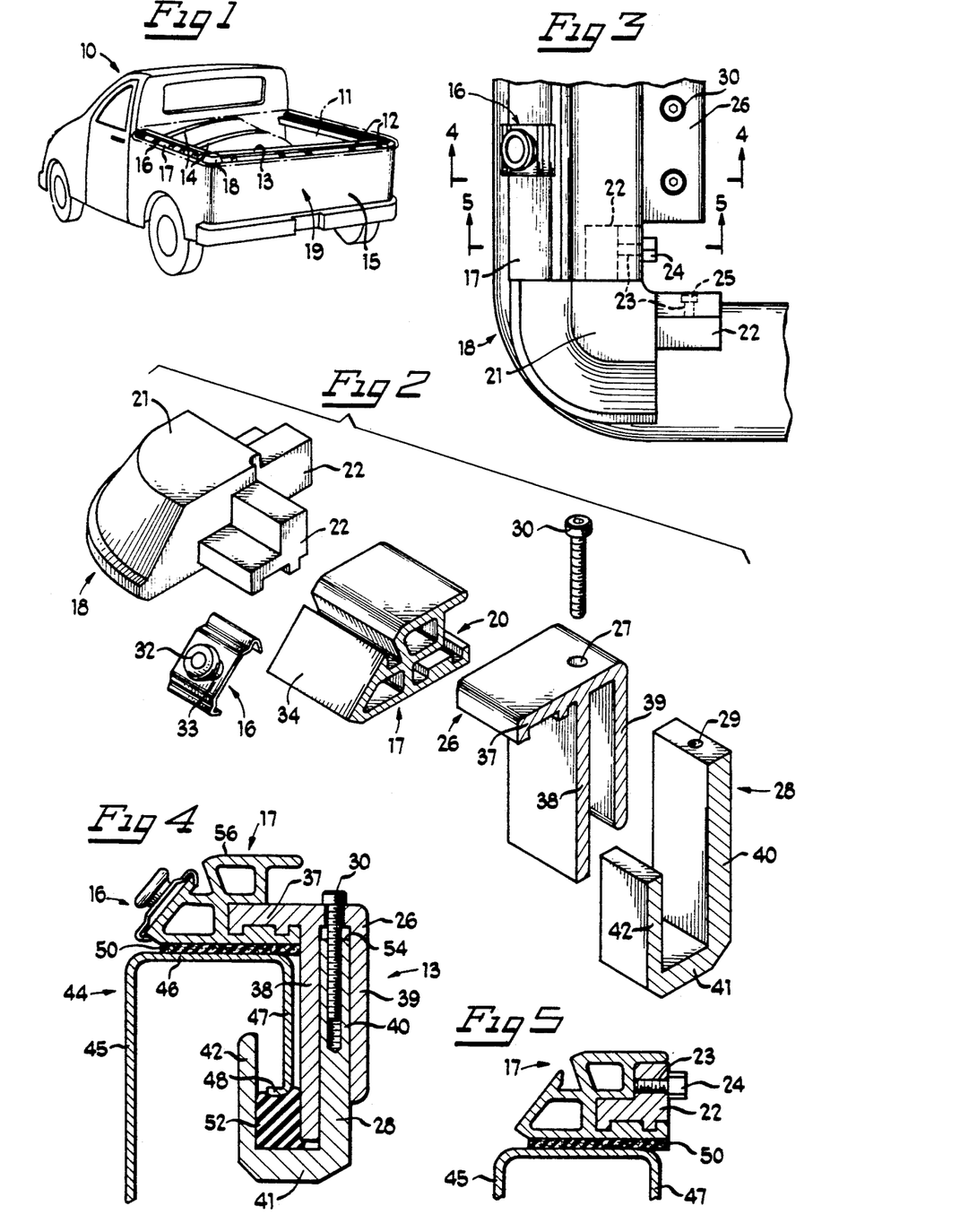
FIG. 1 is a perspective view of a pickup truck, showing a cover, in fragmented view, in place on the truck bed, and further showing the system for mounting the cover, according to the preferred embodiment of the invention.
FIG. 2 is a perspective exploded view of some of the components of the system for mounting a cover.
FIG. 3 is a top plan view of a corner portion of the system for mounting a cover.
FIG. 4 is a side elevation, in section, of a rail member, clamped into place on the side wall of a truck bed.
FIG. 5 is a side elevation, in section, of a rail member, receiving an attachment element of a corner member.

A pickup truck 10, is shown in FIG. 1, having a truck bed cover 11. Cover Il comprises a sheet, either of a single piece, or a number of panels, of suitable durable, and water-repellent material, such as canvas, or heavy plastic.

A plurality of female snap members 12 are attached along the periphery of cover 11. Female snap members 12 are received by male snap members 16 of rail system 13, according to the present invention. Male snap members 16 are removable from the outer surface of rail system 13 so as to enable repositioning thereof along the length of rail members 17, and subsequent alignment with the corresponding female snap members 12. Rail system 13 further includes corner members 18. Cover 11 is further supported by bows 14, so as to keep the central region of cover 11 elevated to promote the runoff of rainwater or other moisture.

In FIG. 2, an exploded view of the elements comprising the rail system is provided. Rail member 17, of which a fragment is shown, comprises, in a preferred embodiment of the invention, a single piece of extruded material, which may be aluminum, steel, or even strong plastic, which extends substantially the entire length of the particular side of truck bed 19 on which it is to be placed.

Rail member 17 is formed to include assembly channel 20, which is shown in this embodiment as having a substantially L-shape, though other configurations may be employed. Corner members 18 are placed at the ends of rail members 17, to join perpendicularly extending rail members 17. Each corner member 18 includes quarter-rounded block 21 and attachment elements 22. Attachment elements 22 each have a cross-section substantially corresponding to the cross-section of attachment channel 20, to provide for a close fit.

To further secure corner member 18 to rail member 17, blind bores 23 are placed in the "inside" surfaces of attachment elements 22, as shown in FIG. 5. T-bolts 24, or set screws 25, the selective use of which is explained in more detail later, have a larger diameter that bores 23, and cause attachment elements 22 to expand, when they are screwed in, creating increased friction between attachment elements 22 and the inside surfaces of attachment channels 20.

In the preferred embodiment of the invention, the rail member 17, which spans across and above tailgate 15 of truck bed 19, is not attached to tail gate 15, but only suspended at its ends by corner members 22, so that tailgate 15 may be freely raised and lowered. Also, the rear corner members 22, or at least the left rear corner member 22, is mounted as seen in FIG. 5, with a T-bolt 24 used on the side wall side of corner piece 22 and a set screw 25 used on the tailgate side. The right rear corner member, of course, would be arranged as a mirror image of FIG. 5. Should it be desired to load an article taller than the tailgate-crossing rail member will permit, by loosening T-bolts 24, the two rear positioned corner members 22 and tailgate-crossing rail member 17 may be readily removed. T-bolts 24 are utilized so as to facilitate removal of tailgate crossing rail member 17 without the need for tools.

The two forward corner members 22 preferably are secured on both sides by set screws 25 (not shown).

Returning to FIG. 2, also shown are upper clamp member 26 having bolt aperture 27, lower clamp member 28 having threaded bore 29, and clamp bolt 30. Upper clamp member 26 and lower clamp member 27 are shown in fragment, in that in the preferred embodiment of the invention, each is sufficiently wide to be provided with two or more bolt apertures 27, and threaded bores 29, respectively, as seen in FIG. 3. Upper clamp members 26, as shown in FIG. 3, may also be used to support bows for supporting cover 11, as described hereinafter. The operation of upper clamp member 26 and lower clamp member 28 is discussed later.

Male snap member 16 includes male snap element 32, which is affixed to clip 33. Clip 33 is advantageously configured to be "snapped" onto clip surface 34, which extends along the entire length of each rail member 17. Clip 33 is further configured to tightly grip clip surface 34, once snapped into a desired position, but may be "snapped" off of clip surface 34, if so desired. Male snap members may thus be repositioned along the length of rail member 17 in order to accommodate covers 11 which have differently arranged female snap members 12. Additionally, changes in the configuration of a particular cover 11, due to stretching, or shrinkage or the like may also be accommodated.

As can be seen in FIG. 2, and in detail in FIG. 4, upper clamp member 26 includes outwardly extending arm 37, which is configured to slidingly fit closely within at least a lower portion of attachment channel 20 of rail member 17. Upper clamp member 26 further includes longer downwardly extending wall 38 and and shorter downwardly extending wall 39, which, in the preferred embodiment of the invention, are parallel and spaced apart just enough to snugly receive long upwardly extending wall 40 of lower clamp member 28. Bolt aperture 27 is positioned to extend through upper clamp member 26, between walls 38 and 39. Lower clamp member 28 also includes bottom wall horizontal 41 and short upwardly extending wall 42.

A section of side wall 44 of a truck bed 19, including outer wall 45 and top edge 46 of the bed of truck 10 are shown in cross section in FIG. 4. Inner wall 47 extends downwardly from top edge 46, and faces the "inside" of truck bed 19. Inner wall 47 may also include lip 48, turned away from the inside of truck bed 19. To attach rail system 13 to side wall 44 of truck bed 19, arm 37 of upper clamp member 26 is inserted into attachment channel 20 of rail member 17. Rail member 17 is then placed on top edge 46 of side wall 44. To protect top edge 46 from damage from rail member 17, gasket member 50, which may be fabricated from foam rubber, or other suitable resilient material, is provided along the length of the bottom surface 51 of rail member 17.

Once rail member 17 is in place, lower clamp member 28 is fitted to upper clamp member 26, with wall 40 of lower clamp member 28 fitting snugly between walls 38 and 39 of upper clamp member 26. Clamp bolt 30 is placed in bolt bore 27, started in threaded bore 29 and tightened down to draw bottom wall 41 up toward top edge 46 of side wall 44, along a substantially vertical axis. Isolator element 52, preferably fabricated of a resilient material, is placed in lower clamp member 28, in the space between short wall 42 and wall 38 of upper clamp member 26, to prevent damage to lip 48 and inner wall 47 of side wall 44, and also to enhance the grip of lower clamp member 28 upon lip 48 and inner wall 47, by deforming slightly and conforming to the respective surfaces of lip 48 and inner wall 47.

Wall 40 of lower clamp member 28, in the preferred embodiment of the invention, must be short enough, with respect to walls 38 and 39, and threaded bore 29 and clamp bolt 30 long enough, so as to permit upper clamp member 26 and lower clamp member 28 to be drawn together and tightly grip top edge 44, inner wall 47 and lip 48, without top surface 54 of wall 40 abutting upper clamp member 28.

Once tightened down, upper clamp member 26 and lower clamp member 28 should grip side wall 44 tightly, but not rigidly, as gasket member 50 and isolator element 52 will permit some movement of the clamp members, and rail member 17, relative to side wall 44, as may be necessary to accommodate minor fluctuations in the tension of cover 11, while in place, as may be caused by expansion or contraction due to heat, cold, excess moisture, or drying, among other conditions.

As mentioned previously, to connect rail members 17, which are positioned on perpendicular walls of truck bed 19, corner members 18 are provided, the details of which are shown in FIGS. 3 and 5. Corner members 18, in the preferred embodiment of the invention, are not clamped to the side walls of truck bed 19, as are rail members 17. Instead, corner members 18 may simply rest atop top edge 46, or, in the case of the forward corner members, they may be simply bolted directly to the side walls, by bolts extending through quarter rounded block 21 into top edge 46 of side wall 44 (not shown). In either embodiment, as with rail members 17, further gasket members are placed along the bottom surface of quarter rounded blocks 21, to protect the top surfaces the side walls from damage. As previously discussed, FIG. 3 indicates the preferred positioning of a left rear corner member 18, relative to rail member 17, and one upper clamp member 26. It is, of course, desirable to position clamp members as close as possible to the ends of rail members 17, as well as at selected positions in between, in order to securely attach rail members 17 to side walls 44.

As indicated earlier, bows are used to elevate the central portions of cover 11, to direct the run-off of moisture out over the sides of truck bed 19. Such bows preferably comprise thin rectangular slats of strong, but flexible material, such as wood, heavy plastic, or thin steel or aluminum. It is contemplated that the present invention can be utilized to accommodate the anchoring of such bows, by wedging the ends of each bow into the attachment channels of opposed rail members 17, or by providing slots, in some or all of upper clamping members 26, for receiving the end of a bow. Moreover, as discussed later, the clamping members can be used to carry cross bars as support structures for such items as ski or bicycle racks.

Once rail members 17 are in place, cover 11 may be draped over bows 14, so that female snap members 12, which are placed along the periphery of cover 11, are positioned over surfaces 34 of rail members 17. Cover 11 should be constructed so as to need to be slightly stretched to attain the just-described positioning. Male snap members 16 can then be positioned beneath respective female snap members 12, and "snapped" into place on rail members 17. Once so positioned, male snap members 16 fit about surfaces 34 tightly enough so as not to slide along rail members 17. In this embodiment of the invention, where male snap members 16 are not configured so as to provide an interference or other tight fit, sliding of male snap members 16 along rail members 17 will be enabled. Should some change occur in the configuration of cover 11 due to weathering, shrinkage, or fatigue stretching, for example, which prevent female snap members 12 from engaging male snap elements 32, male snap members 16 may be pried off of the particular rail member 17, and repositioned to accommodate the changed configuration of cover 11.

Figure 6:
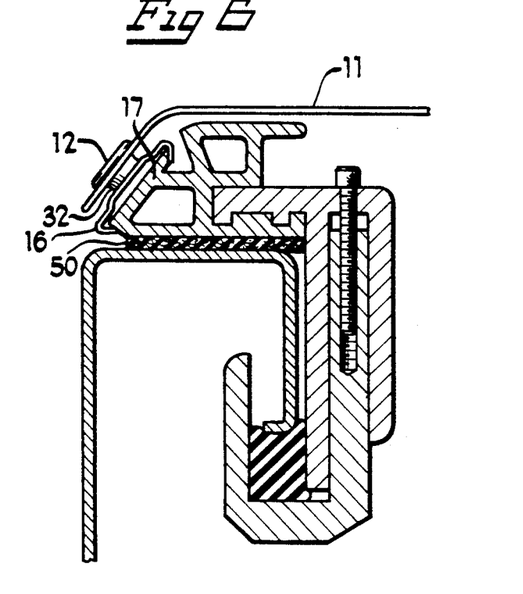
FIG. 6 is a fragmentary view, in section, of a rail member, with a cover in place, and the female snap member snapped onto the male snap element.

When cover 11 is in place, female snap members 12 cover male snap elements 32. Cover 11 is drawn and held closely over the top surface 56 of rail members 17. Surface 34 of rail members 17, are angled downwardly and outwardly from top surface 56, to facilitate stretching of cover 11 to bring female snap members 12 and male snap elements 32 into alignment. The amount of tension in cover 11 should be enough to maintain cover 11 taut, but should not be so great as to promote the spontaneous "popping off" of female snap members 12 from male snap elements 32. FIG. 6 illustrates a portion of cover 11, with female snap member 12 in position and snapped onto male snap element 32, with cover 11 extending over top surface 34.

Figure 7:
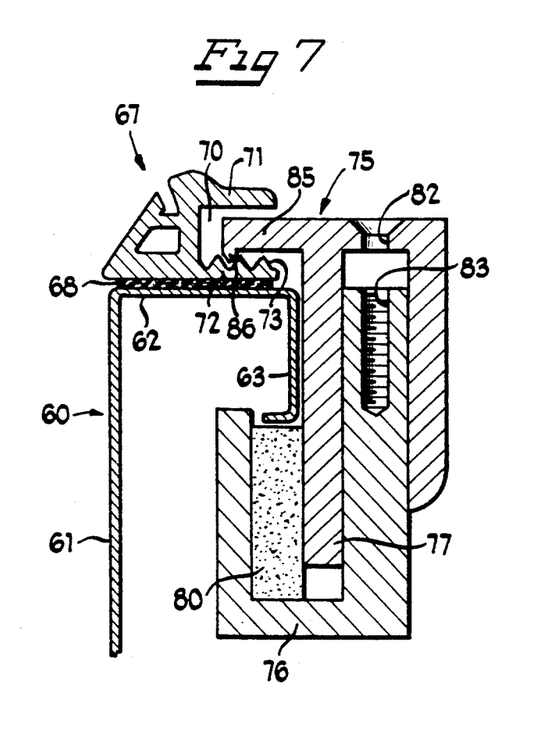
FIG. 7 is a side elevation, in section, showing an alternative preferred embodiment of the invention, for accommodating enclosure side walls having varying widths.

It is known that the configurations of the side walls of truck beds, and the like, vary from model to model, and from manufacturer to manufacturer. Accordingly, the present invention contemplates a construction, which may accommodate side walls having different overall widths. For example, as shown in FIG. 7, truck bed side wall 60, which includes outer wall 61, top wall 62, inner wall 63, and rim 64, is shown. Rail member 67 rests atop top wall 62, with gasket member 68 placed in between to prevent damage or marring of top wall 62. Rail member 67 has formed therein assembly channel 70, which is bounded by upper flange 71, and lower flange 72. Upper flange 71 and lower flange 72 should extend horizontally, and substantially parallel to top wall 62 of side wall 60, so as to make assembly channel 70 a horizontally extending, substantially rectangular space. A series of v-shaped grooves 73 are formed along the upper surface of lower flange 72, which may extend along the length of rail member 67.

Rail member 67 is held in by place by upper clamp member 75 and lower clamp member 76, in cooperation with isolator element 80. Upper clamp member 75 has formed therein bolt aperture 82 and lower clamp member 76 has formed therein threaded aperture 83, and the upper and lower clamp members cooperate in the same manner as previously discussed, to grasp inner wall 63 and rim 64 of side wall 60 of the truck bed. However, the cooperation of upper clamp member 75 with rail member 67 enables different sized side walls to be accommodated.

In particular, upper clamp member 75 has an outwardly extending flange 85, with a downwardly projecting bead 86 placed at the outermost end thereof. Bead 86 is configured to fit closely into any one of grooves 73. In order to accommodate a wide variety of widths of side walls 60, Upper flange 71, lower flange 72, and outwardly extending flange 85 must be provided with considerable overlap, when flange 85 is inserted into assembly channel 70. Depending upon the width of top wall 62, flange 85 is inserted into assembly channel far enough, so that rail member 67 is squarely seated on top wall 62, and long wall 77 of upper clamp member 75 is adjacent inner wall 63. When upper clamp member 76 is tightened down relative to lower clamp member 76, then bead 86 firmly seats into the selected groove 73 of lower flange 72, and rail member 67 is secured. For a wider, or narrower top wall 62, bead 86 is merely placed in a further outward, or inward groove.

Although a vehicle owner may wish to have a cover, such as described, in place at all possible times, it is still desirable to enable the vehicle owner to derive maximum utility from the vehicle. Cross bars, mounted on the rail members 17, would help accomplish such maximum utilization. Such cross bars may form part of bicycle or ski racks, or racks for externally carried stowage, for example.

Figures 8, 8A, 8B:
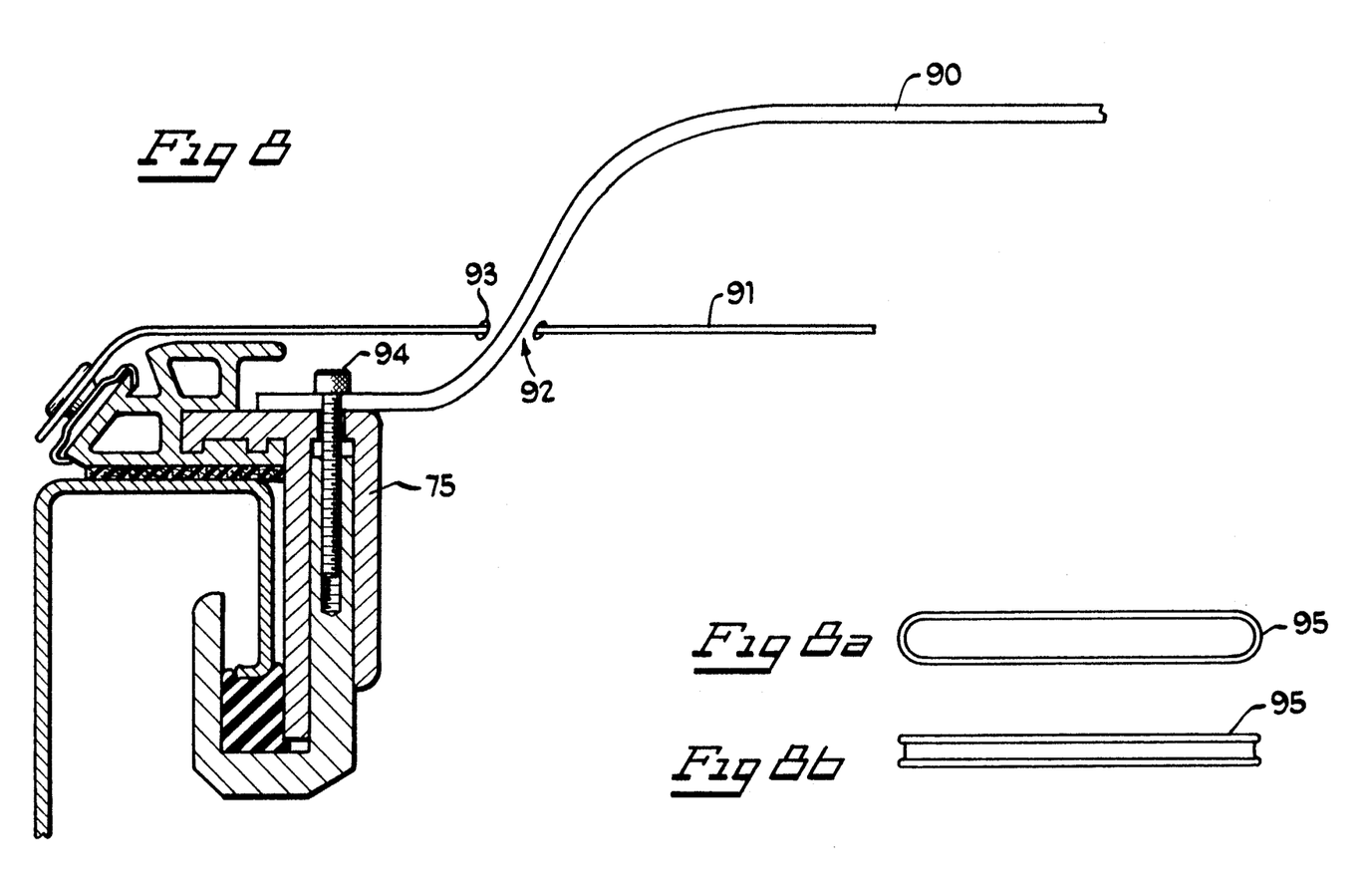

Above-cover cross bar 90 is seen in FIG. 8, mounted in place on upper clamp member 75, held in place by bolt 94 which is arranged between or to the sides of bolts 30 (not shown) which hold upper clamp members 75 and lower clamp members 76 together. Cover 91 is provided with elongated apertures 92, through which supports 90 pass. Preferably, apertures 92 are closely fitted to the dimensions of supports 90 so as to preclude the inward leakage of moisture, dirt, and the like. While cross bar 90 is shown as being held by upper clamp 75 and lower clamp 76, which also hold rail member 17, a separate upper and lower clamp pair, dedicated solely to holding cross bar 90 (not shown), may be utilized.

A bead 93 is provided around each aperture 92, to improve resistance to tearing and fraying of the material of cover 91, and as well to help resist the flow of moisture into aperture 92.

When above-cover cross bars 90 are not in use, sealing grommets 95, seen from above in FIG. 8a, and from the side in FIG. 8b, are snapped into apertures 92. Grommets 95 are preferably fabricated from rubber, pliable plastic or the like.

Figure 9:
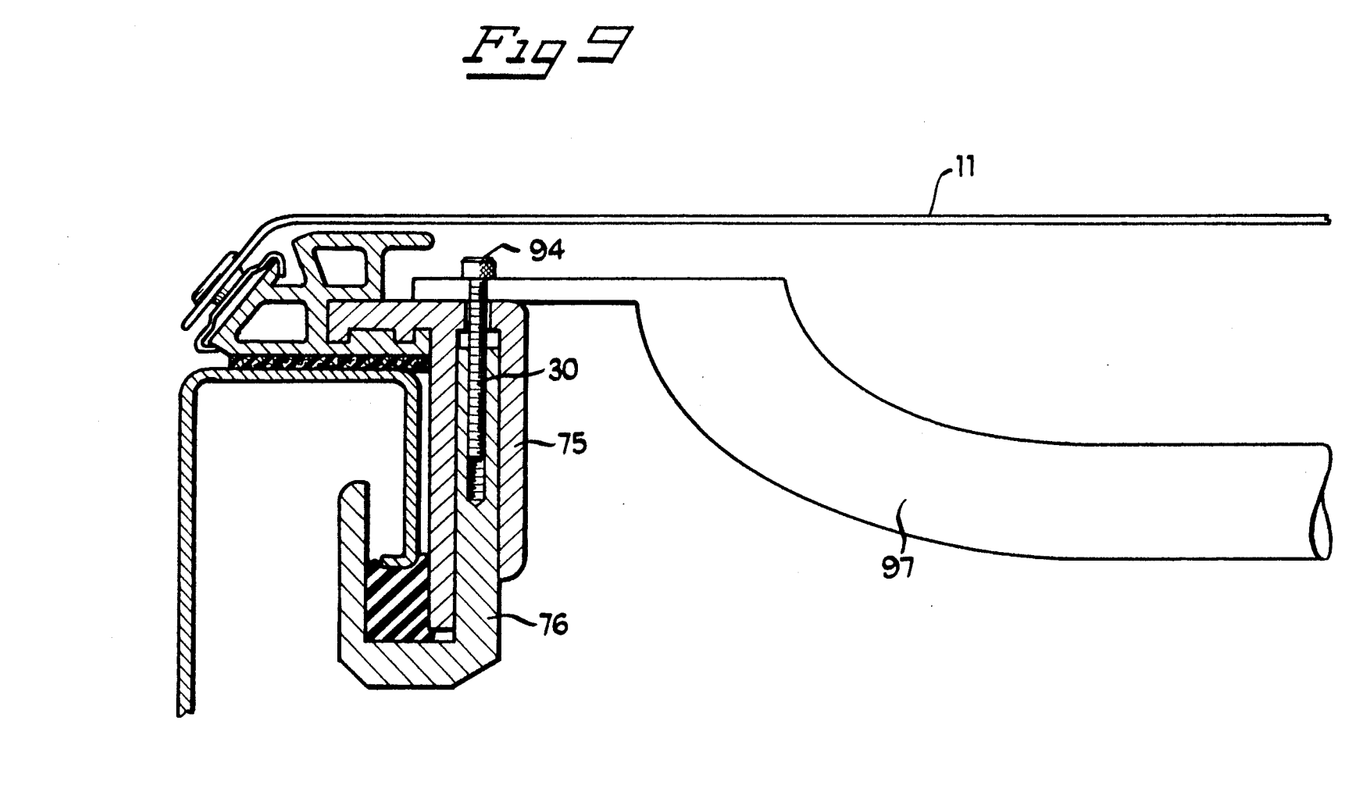
FIG. 9 is a side elevation, in section, showing an alternative preferred embodiment of the invention, including a below-cover cross bar.

For carrying items below an installed cover, below-cover cross bar 97 may be used, as shown in FIG. 9. An uninterrupted cover, such as cover 11, previously described, may be employed. As in the previous embodiment, support 97 is mounted directly atop upper clamp member 75 and held in place by bolt 94. Alternatively, since support 97 extends completely below cover 11, support 97 could be held by clamp bolts 30, which also hold upper clamp members 75 and lower clamp members 76 together. Support 97 is suitable for carrying elongated items, such as skis.

The foregoing description and drawings merely explain and illustrate the invention and the invention is not limited thereto except insofar as the appended claims are so limited, as those skilled in the art who have the disclosure before them will be able to make modifications and variations therein, without departing from the scope of the invention.

What is claimed is:

1. An apparatus for attaching a cover for an open-topped vehicle enclosure, such as a pickup truck bed, said enclosure having a plurality of side walls, each side wall including an outer wall, a top wall extending substantially horizontally inwardly from said outer wall, and an inner wall projecting downwardly from an inner edge of said top wall, said apparatus for attaching a cover comprising:

at least one rail member, having a bottom surface configured to rest on an upper surface of said top wall;

at least one cover attachment member, removably affixable to said at least one rail member, for engaging a peripheral portion of the cover;

at least one upper clamp member interlockingly engageable with said at least one rail member;

at least one lower clamp member configured to grippingly receive a lower edge of said inner wall of said side wall;

said at least one upper clamp member and said at least one lower clamp member being operably engageable and vertically adjustable relative to each other, to enable said at least one upper clamp member to press said at least one rail member downwardly onto said top wall of said side wall and enable said at least one lower clamp member to push upwardly against said lower edge of said inner wall of said side wall, so as to grasp or release said inner wall and at least a portion of said top wall of said side wall vertically therebetween to clamp said at least one rail member onto said top wall of said side wall; and means for vertically adjusting said at least one upper clamp member and said at least one lower clamp member relative to each other.

2. The apparatus for attaching a cover according to claim 1, further comprising:

cushion means operably disposed along said bottom surface of said at least one rail member to preclude damage to said top wall of said side wall when said at least one upper clamp member and said at least one lower clamp member are adjusted to grip said top wall and said inner wall.

3. The apparatus for attaching a cover according to claim 1, having at least two rail members, further comprising:

at least one corner member configured to connect said rail members in perpendicular relationship to each other.

4. The apparatus for attaching a cover according to claim 1, wherein said at least one lower clamp member further comprises:

a resilient cushion member configured to deformably receive said lower portion of said inner wall of said side wall.

5. The apparatus for attaching a cover according to claim 1, wherein said at least one cover attachment member comprises:

a clip member interlockingly and removably engageable with said at least one rail member; and a male snap member affixed to said clip member, said male snap member being separably engageable with any of a plurality of female snap members arranged along a peripheral region of said cover.

6. The apparatus for attaching a cover according to claim 1, wherein said means for adjusting said at least one upper clamp member and said at least one lower clamp member relative to each other comprises:

a bolt;

a bolt receiving aperture extending vertically through said at least one upper clamp member; and a threaded bore disposed vertically within said at least one lower clamp member, said bolt receiving aperture and said threaded bore being aligned when said at least one upper clamp member and said at least one lower clamp member are engaged, said at least one upper clamp member and said at least one lower clamp member being drawn together when said bolt is passed through said bolt receiving aperture, screwed into said threaded bore and tightened.

7. The apparatus for attaching a cover according to claim 3, further comprising:

at least one attachment channel operably arranged within each of said at least two rail members to extend longitudinally throughout said at least one rail member to open on at least one end thereof; and at least two attachment members emanating from a central portion of said at least one corner member, perpendicularly relative to each other, each of said at least two attachment members being configured to be received within said at least one attachment channel.

8. The apparatus for attaching a cover according to claim 7, further comprising:

means for affixing said at least two rail members to said at least one corner member, when each of said at least two attachment members have been received by said each said at least one attachment channel in each of said at least two rail members.

9. The apparatus for attaching a cover according to claim 1, comprising:

said at least one upper clamp member having two downwardly projecting walls, said walls being arranged in substantially parallel spaced relationship;

said at least one lower clamp member having an upwardly projecting wall, said upwardly projecting wall being configured to closely fit slidingly between said two downwardly projecting walls of said at least one upper clamp member.

10. The apparatus for attaching a cover according to claim 1, wherein said apparatus further comprises:

means for enabling said at least one rail member, said at least one upper clamp member, and said at least one lower clamp member to cooperate to clamp said at least one rail member onto top walls having varying widths.

11. The apparatus for attaching a cover according to claim 1, wherein said apparatus further comprises:

at least one cross bar member having two ends extending between opposed side walls of said open-topped vehicle enclosure, said ends of said at least one cross bar member being mounted on respective upper clamp members engaging rail members clamped onto said opposed side walls.

12. The apparatus according to claim 11 wherein said at least one cross bar member comprises:

an elongated upwardly convex-shaped support member extending through said cover at positions adjacent its ends, and extending above said cover for substantially all of its length.

13. The apparatus according to claim 11 wherein said at least one cross bar member comprises:

an elongated, upwardly concave-shaped support member extending entirely beneath said cover for all of its length.

14. The apparatus according to claim 11, wherein said apparatus further comprises:

at least one support bow, having two ends, extending between opposed side walls of said open-topped vehicle enclosure, said ends of said at least one support bow being mounted on respective upper clamp members engaging rail members engaging rail members clamped onto said opposed side walls.

15. The apparatus according to claim 14 wherein said at least one support bow comprises: an elongated, upwardly convex-shaped member extending entirely beneath said cover to maintain said cover in an upwardly convex configuration.

16. The apparatus for attaching a cover according to claim 1, wherein said at least one upper clamp member and said at least one lower clamp member, when vertically adjusted to release said at least one rail member, are horizontally slidable along said at least one rail member, to enable selective repositioning of said at least one upper clamp member and said at least one lower clamp member relative to said at least one rail member.

* * * * *